United States Patent
Jain et al.

(10) Patent No.: US 7,979,420 B2
(45) Date of Patent: Jul. 12, 2011

(54) HANDLING SILENT RELATIONS IN A DATA STREAM MANAGEMENT SYSTEM

(75) Inventors: Namit Jain, Santa Clara, CA (US);
Anand Srinivasan, Karnataka (IN);
Shailendra Kumar Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 11/873,407

(22) Filed: Oct. 16, 2007

(65) Prior Publication Data

US 2009/0100029 A1    Apr. 16, 2009

(51) Int. Cl.
*G06F 17/30* (2006.01)

(52) U.S. Cl. .................................. 707/713; 707/796

(58) Field of Classification Search ........ 707/4, E17.136, 707/600, 713, 796; 709/202; 370/232, 412
See application file for complete search history.

(56) References Cited

U.S. PATENT DOCUMENTS

| | | | |
|---|---|---|---|
| 4,996,687 A | 2/1991 | Hess et al. |
| 5,495,600 A | 2/1996 | Terry et al. |
| 5,822,750 A | 10/1998 | Jou et al. |
| 6,006,235 A | 12/1999 | Macdonald et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,370,537 B1 | 4/2002 | Gilbert et al. |
| 6,438,540 B2 | 8/2002 | Nasr et al. |
| 6,449,620 B1 | 9/2002 | Draper et al. |
| 6,546,381 B1 | 4/2003 | Subramanian et al. |
| 6,836,778 B2 | 12/2004 | Manikutty et al. |
| 6,985,904 B1 | 1/2006 | Kaluskar et al. |
| 7,145,938 B2 | 12/2006 | Takeuchi et al. |
| 7,310,638 B1 | 12/2007 | Blair |
| 7,383,253 B1 * | 6/2008 | Tsimelzon et al. ............... 707/3 |
| 7,403,959 B2 | 7/2008 | Nishizawa et al. |
| 7,673,065 B2 | 3/2010 | Srinivasan et al. |
| 2002/0116371 A1 | 8/2002 | Dodds et al. |
| 2002/0133484 A1 | 9/2002 | Chau et al. |
| 2002/0169788 A1 | 11/2002 | Lee et al. |

(Continued)

OTHER PUBLICATIONS

Design and implementation of stream operators, query instantiator and stream buffer manager by Altaf Ginlani dated Dec. 2003, 138 pages.*

(Continued)

*Primary Examiner* — Mohammad Ali
*Assistant Examiner* — Thuy (Tiffany) Bui
(74) *Attorney, Agent, or Firm* — Silicon Valley Patent Group LLP; Omkar Suryadevara

(57) ABSTRACT

A new continuous query to a data stream management system (DSMS) may use a silent relation whose source does not provide any heartbeats. During execution of any given operator, the DSMS processes data from one input ("active input") using its time stamp as if the same time stamp is received from another input whose relation has fallen silent ("empty input"), if one or more predetermined conditions are met. One predetermined condition is that the empty input's operator has all its own inputs silent. And another predetermined condition is that a maximum time stamp that is currently present among all the inputs of the empty input's operator is equal to a time stamp that was last received from these same inputs. When both conditions are met, previously received data from the empty input is time stamped with the same time stamp as the most recently received data from the active input.

20 Claims, 6 Drawing Sheets

U.S. PATENT DOCUMENTS

| | | | |
|---|---|---|---|
| 2003/0037048 | A1 | 2/2003 | Kabra et al. |
| 2003/0065659 | A1 | 4/2003 | Agarwal et al. |
| 2004/0064466 | A1 | 4/2004 | Manikutty et al. |
| 2004/0167864 | A1 | 8/2004 | Wang et al. |
| 2004/0220912 | A1 | 11/2004 | Manikutty et al. |
| 2004/0220927 | A1 | 11/2004 | Murthy et al. |
| 2004/0267760 | A1 | 12/2004 | Brundage et al. |
| 2005/0055338 | A1 | 3/2005 | Warner et al. |
| 2005/0065949 | A1 | 3/2005 | Warner et al. |
| 2005/0096124 | A1 | 5/2005 | Stronach |
| 2005/0097128 | A1 | 5/2005 | Ryan et al. |
| 2005/0174940 | A1* | 8/2005 | Iny ............................. 370/232 |
| 2005/0229158 | A1 | 10/2005 | Thusoo et al. |
| 2005/0289125 | A1 | 12/2005 | Liu et al. |
| 2006/0031204 | A1 | 2/2006 | Liu et al. |
| 2006/0100969 | A1 | 5/2006 | Wang et al. |
| 2006/0224576 | A1 | 10/2006 | Liu et al. |
| 2006/0230029 | A1 | 10/2006 | Yan |
| 2006/0235840 | A1 | 10/2006 | Manikutty et al. |
| 2007/0022092 | A1 | 1/2007 | Nishizawa et al. |
| 2007/0039049 | A1 | 2/2007 | Kupferman et al. |
| 2007/0136254 | A1 | 6/2007 | Choi et al. |
| 2007/0294217 | A1 | 12/2007 | Chen et al. |
| 2008/0028095 | A1 | 1/2008 | Lang et al. |
| 2008/0046401 | A1 | 2/2008 | Lee et al. |
| 2008/0082514 | A1 | 4/2008 | Khorlin et al. |
| 2008/0114787 | A1* | 5/2008 | Kashiyama et al. .......... 707/100 |
| 2008/0301124 | A1 | 12/2008 | Alves et al. |
| 2009/0043729 | A1 | 2/2009 | Liu et al. |
| 2009/0070786 | A1 | 3/2009 | Alves et al. |
| 2009/0106189 | A1 | 4/2009 | Jain et al. |
| 2009/0106190 | A1 | 4/2009 | Srinivasan et al. |
| 2009/0106198 | A1 | 4/2009 | Srinivasan et al. |
| 2009/0106214 | A1 | 4/2009 | Jain et al. |
| 2009/0106215 | A1 | 4/2009 | Jain et al. |
| 2009/0106440 | A1 | 4/2009 | Srinivasan et al. |
| 2009/0248749 | A1 | 10/2009 | Gu et al. |

OTHER PUBLICATIONS

Arasu, A. et al. "STREAM: The Stanford Data Stream Management System", Department of Computer Science, Stanford University, 2004, pp. 21.
Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.
Terry, D.B. et al. "Continuous queries over append-only databases", Proceedings of 1992 ACM SIGMOD, pp. 321-330.
Arasu, A. et al. "The CQL Continuous Query Language: Semantic Foundation and Query Execution", VLDB Journal, vol. 15, Issue 2, Jun. 2006, pp. 32.
Arasu, A. et al. "An Abstract Semantics and Concrete Language for Continuous Queries over Streams and Relations", $9^{th}$ International Workshop on Database programming languages, Sep. 2003, pp. 12.
Entire Prosecution History of U.S. Appl. No. 11/874,197, filed Oct. 17, 2007 by Namit Jain et al.
Entire Prosecution History of U.S. Appl. No. 11/874,202, filed Oct. 17, 2007 by Namit Jain et al.
Entire Prosecution History of U.S. Appl. No. 11/874,896, filed Oct. 18, 2007 by Anand Srinivasan et al.
Entire Prosecution History of U.S. Appl. No. 11/977,439, filed Oct. 20, 2007 by Anand Srinivasan et al.
Entire Prosecution History of U.S. Appl. No. 11/977,437, filed Oct. 20, 2007 by Anand Srinivasan et al.
Entire Prosecution History of U.S. Appl. No. 11/977,440, filed Oct. 20, 2007 by Anand Srinivasan et al.
Entire Prosecution History of U.S. Appl. No. 11/874,850, filed Oct. 18, 2007 by Namit Jain et al.
Office Action dated Dec. 3, 2009 in U.S. Appl. No. 11/874,202.
Amendment dated Apr. 8, 2010 in U.S. Appl. No. 11/874,202.
Final Office Action dated Jun. 8, 2010 in U.S. Appl. No. 11/874,202.
Request for Continued Examination and Amendment dated Sep. 8, 2010 in U.S. Appl. No. 11/874,202.
Preliminary Amendment dated Oct. 15, 2009 in U.S. Appl. No. 11/874,850.
Notice of Allowance dated Nov. 24, 2009 in U.S. Appl. No. 11/874,850.
Supplemental Notice of Allowance dated Dec. 11, 2009 in U.S. Appl. No. 11/874,850.
Supplemental Notice of Allowance dated Jan. 27, 2010 in U.S. Appl. No. 11/874,850.
Amendment after Notice of Allowance dated Feb. 24, 2010 in U.S. Appl. No. 11/874,850.
Preliminary Amendment dated Oct. 16, 2009 in U.S. Appl. No. 11/874,896.
Office Action dated Dec. 8, 2009 in U.S. Appl. No. 11/874,896.
Amendment dated Apr. 8, 2010 in U.S. Appl. No. 11/874,896.
Final Office Action dated Jul. 23, 2010 in U.S. Appl. No. 11/874,896.
Request for Continued Examination and Amendment dated Oct. 25, 2010 in U.S. Appl. No. 11/874,896.
Preliminary Amendment dated Oct. 15, 2009 in U.S. Appl. No. 11/977,439.
Office Action dated Apr. 13, 2010 in U.S. Appl. No. 11/977,439.
Amendment dated Jul. 13, 2010 in U.S. Appl. No. 11/977,439.
Notice of Allowance dated Aug. 18, 2010 in U.S. Appl. No. 11/977,439.
Office Action dated Oct. 13, 2009 in U.S. Appl. No. 11/977,437.
Amendment dated Jan. 13, 2010 in U.S. Appl. No. 11/977,437.
Final Office Action dated Apr. 8, 2010 in U.S. Appl. No. 11/977,437.
Request for Continued Examination and Amendment dated Sep. 8, 2010 in U.S. Appl. No. 11/977,437.
Notice of Allowance dated Oct. 7, 2009 in U.S. Appl. No. 11/977,440.
Amendment after Notice of Allowance dated Dec. 5, 2009 in U.S. Appl. No. 11/977,440.
Response to Amendment dated Jan. 7, 2010 in U.S. Appl. No. 11/977,440.
Preliminary Amendment dated Oct. 14, 2009 in U.S. Appl. No. 11/874,197.
Office Action dated Nov. 10, 2009 in U.S. Appl. No. 11/874,197.
Amendment dated Mar. 10, 2010 in U.S. Appl. No. 11/874,197.
Final Office Action dated Jun. 29, 2010 in U.S. Appl. No. 11/874,197.
Request for Continued Examination and Amendment dated Oct. 29, 2010 in U.S. Appl. No. 11/874,197.
Office Action dated Sep. 17, 2008 in U.S. Appl. No. 11/601,415.
Amendment dated Jan. 20, 2009 in U.S. Appl. No. 11/601,415.
Final Office Action dated May 27, 2009 in U.S. Appl. No. 11/601,415.
Amendment dated Jul. 27, 2009 in U.S. Appl. No. 11/601,415.
Request for Continued Examination and Amendment dated Aug. 27, 2009 in U.S. Appl. No. 11/601,415.
Office Action dated Nov. 30, 2009 in U.S. Appl. No. 11/601,415.
Amendment dated Mar. 29, 2010 in U.S. Appl. No. 11/601,415.
Final Office Action dated Jun. 30, 2010 in U.S. Appl. No. 11/601,415.
Request for Continued Examination and Amendment dated Nov. 1, 2010 in U.S. Appl. No. 11/601,415.
Sharaf et al. "Efficient Scheduling of Heterogeneous Continuos Queries", VLDB '06, Sep. 12-15, 2006, pp. 511-522.
Golab, L. "Sliding Window Query Processing over data streams", University of Waterloo, Canada, Aug. 2006.
Babu, S. et al. "Continuous Queries over Data Streams", SIGMOD Record, Sep. 2001, pp. 12.
Munagala, K. et al. "Optimization of Continuous Queries with Shared Expensive Filters", Proceedings of the 26th ACM SIGMOD-SIGACT-SIGART symposium on Principles of database systems, believed to be prior to Oct. 17, 2007, pp. 14.
Buza, A. "Extension of CQL over Dynamic Databases", Journal of Universal Computer Science, vol. 12, No. 9, 2006, pp. 12.
Avnur, R. et al. "Eddies: Continuously Adaptive Query Processing", In Proceedings of the 2000 ACM SIGMOD International Conference on Management of Data, Dallas, TX, May 2000, pp. 12.
Avnur, R. et al. "Eddies: Continuously Adaptive Query Processing", slide show, believed to be prior to Oct. 17, 2007, pp. 4.
Madden, S. et al. "Continuously Adaptive Continuous Queries (CACQ) over Streams", SIGMOD, 2002, pp. 6.
Deshpande, A. et al. "Adaptive Query Processing", believed to be prior to Oct. 17, 2007, pp. 27.

Widom, J. et al. "CQL: A Language for Continuous Queries over Streams and Relations", believed to be prior to Oct. 17, 2007, pp. 31.

Motwani, R. et al. "Models and Issues in Data Stream Systems", Proceedings of the 21st ACM SIGMOD-SIGACT-SIGART symposium on Principles of database systems, 2002, pp. 26.

Widom, J. et al. "The Stanford Data Stream Management System", believed to be prior to Oct. 17, 2007, pp. 24.

Oracle Application Server 10 g Release 2 and 3, New Features Overview, An Oracle White Paper, Oct. 2005, pp. 48.

Oracle Database, SQL Language Reference, 11 g Release 1 (11.1), B28286-02, Sep. 2007, pp. 144.

Stream Query Repository: Online Auctions, http://www-db.stanford.edu/stream/sqr/onauc.html#queryspecsend , Dec. 2, 2002, pp. 2.

Stream Query Repository: Online Auctions (CQL Queries), http://www-db.stanford.edu/stream/sqr/cql/onauc.html , Dec. 2, 2002, pp. 3.

Diao, Y. "Query Processing for Large-Scale XML Message Brokering", 2005, University of California Berkeley, pp. 226.

Diao, Y. et al. "Query Processing for High-Volume XML Message Brokering", Proceedings of the 29th VLDB Conference, Berlin, Germany, 2003, pp. 12.

Lakshmanan, L.V.S. et al. "On efficient matching of streaming XML documents and queries", 2002, pp. 18.

Chan, C. et al. "Efficient filtering of XML documents with XPath expressions", VLDB Journal, 2002, pp. 354-379.

Jin, C. et al. "ARGUS: Efficient Scalable Continuous Query Optimization for Large-Volume Data Streams", 10th International Database Engineering and Applications Symposium (IDEAS'06), 2006, pp. 7.

Bose, S. et al., "A Query Algebra for Fragmented XML Stream Data", 9th International Workshop on Data Base Programming Languages (DBPL), Sep. 2003, Postdam, Germany, http://lambda.uta.edu/dbp103.pdf, pp. 11.

Fernandez, Mary et al., "Build your own XQuery processor", http://edbtss04.dia.uniroma3.it/Simeon.pdf, pp. 116.

Fernandez, Mary et al., Implementing XQuery 1.0: The Galax Experience:, Proceedings of the 29th VLDB Conference, Berlin, Germany, 2003, pp. 4.

Florescu, Daniela et al., "The BEA/XQRL Streaming XQuery Processor", Proceedings of the 29th VLDB Conference, 2003, Berlin, Germany, pp. 12.

Amendment dated Feb. 22, 2011 in U.S. Appl. No. 11/874,896, 19 pages.

Arasu A. "CQL: A Language for Continuous Queries over Streams and Relations", 2004, Lecture Notes in Computer Science, vol. 2921/2004, pp. 1-19.

Examiner Interview Summary dated Sep. 14, 2010 in U.S. Appl. No. 11/874,202, 3 pages.

Notice of Allowance dated Dec. 22, 2010 in U.S. Appl. No. 11/874,202, 13 pages.

Examiner Interview Summary dated Nov. 18, 2009 in U.S. Appl. No. 11/874,850, 3 pages.

Examiner Interview Summary dated Oct. 25, 2010 in U.S. Appl. No. 11/874,896, 3 pages.

Office Action dated Nov. 22, 2010 in U.S. Appl. No. 11/874,896, 25 pages.

Terminal Disclaimer dated Jul. 13, 2010 in U.S. Appl. No. 11/977,439 over U.S. Appl. No. 11/874,896, 2 pages.

Terminal Disclaimer dated Jul. 13, 2010 in U.S. Appl. No. 11/977,439 over US Patent 7,673,065, 2 pages.

Terminal Disclaimer dated Jul. 13, 2010 in U.S. Appl. No. 11/977,439 over U.S. Appl. No. 11/977,437, 2 pages.

Notice of Allowance dated Nov. 24, 2010 in U.S. Appl. No. 11/977,439, 8 pages.

Second Preliminary Amendment dated Oct. 14, 2009 in U.S. Appl. No. 11/874,197, 3 pages.

Interview Summary dated Nov. 16, 2010 in U.S. Appl. No. 11/874,197, 4 pages.

Office Action dated Dec. 22, 2010 in U.S. Appl. No. 11/874,197, 22 pages.

Advisory Action dated Aug. 18, 2009 in U.S. Appl. No. 11/601,415, 3 pages.

Examiner Interview Summary dated Oct. 12, 2010 in U.S. Appl. No. 11/601,415, 3 pages.

Examiner Interview Summary dated Aug. 17, 2010 in U.S. Appl. No. 11/977,437, 3 pages.

Examiner Interview Summary dated Dec. 1, 2009 in U.S. Appl. No. 11/977,440, 3 pages.

* cited by examiner

```
Q1: Select B, max(A)
    From   S1 [Rows 50,000]
    Group By B
```

```
Q2: Select Istream(*)
    From   S1 [Rows 40,000], S2 [Range 600 Seconds]
    Where  S1.A = S2.A
```

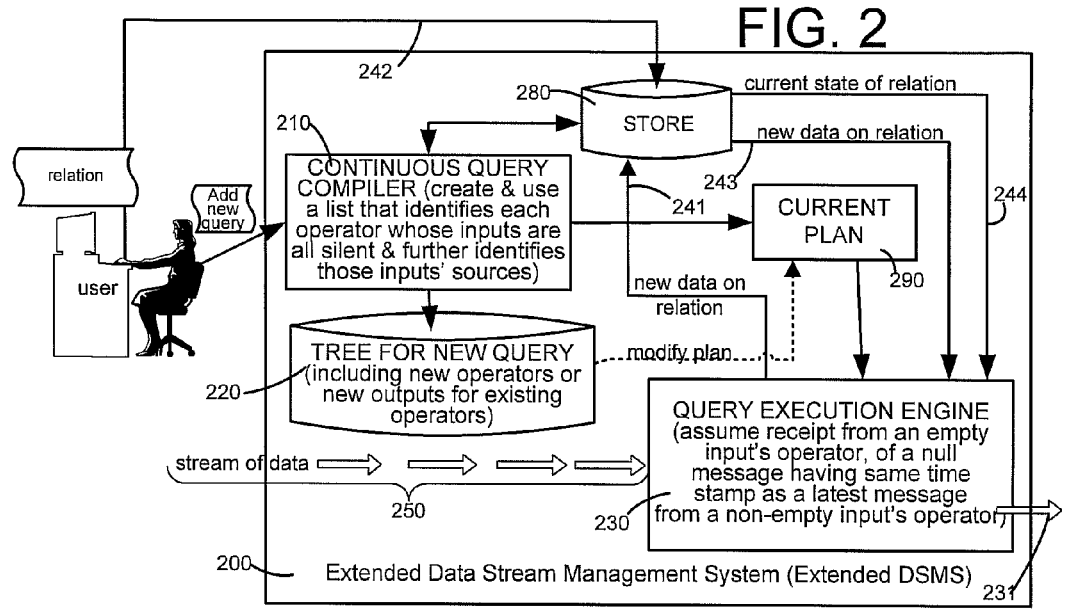
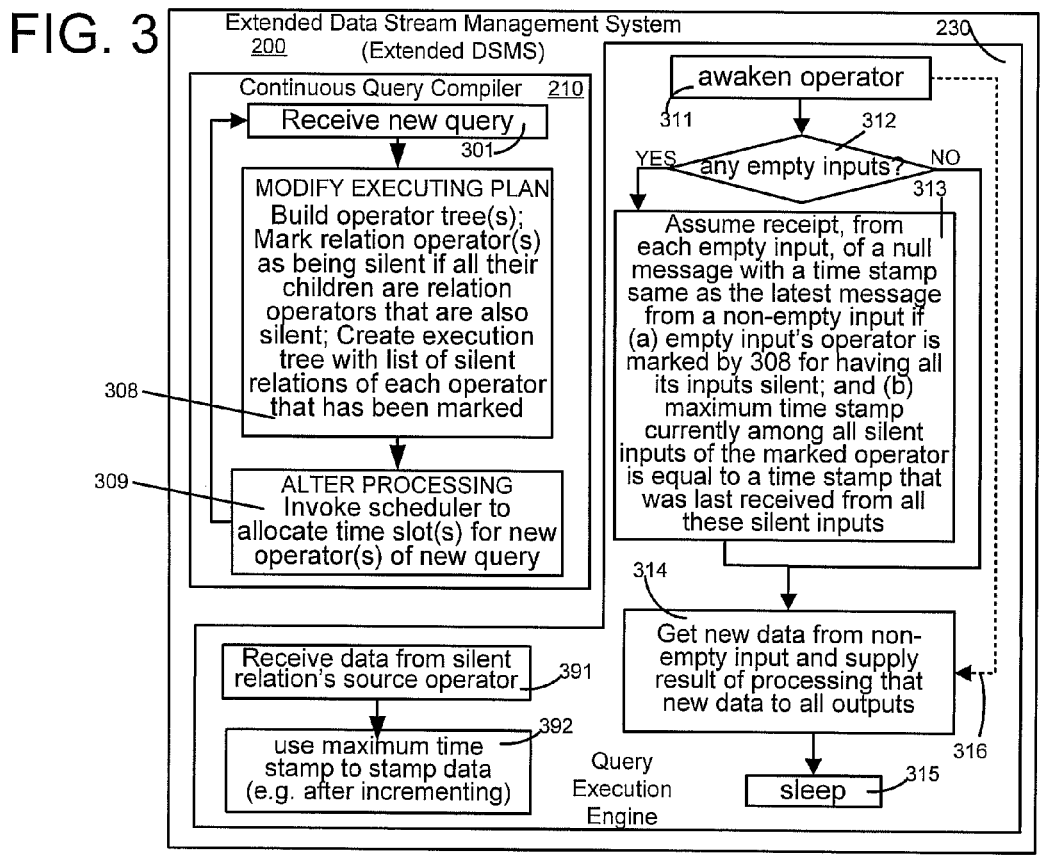

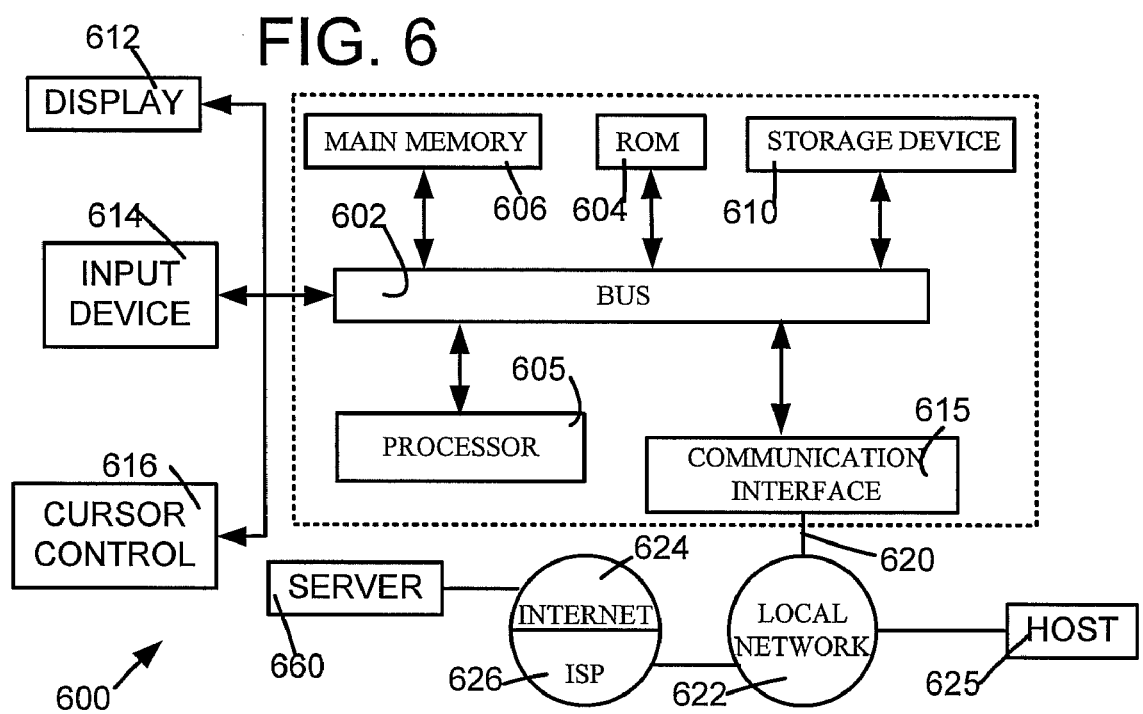

HANDLING SILENT RELATIONS IN A DATA STREAM MANAGEMENT SYSTEM

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to relatively static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream(s) that matches a query and based on such identified data the engine generates output data, in a streaming fashion.

As noted above, one such system was built at Stanford University, in a project called the Standford Stream Data Management (STREAM) Project which is described in an article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom published on the Internet in 2004. The just-described article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p 379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t increases monotonically. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E which are reproduced from the VLDB Journal paper described in the previous paragraph. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat relations that change infrequently similar to streams of data that change very frequently, which is insufficient to handle situations that may sometimes arise from failure of such a source to send data to the DSMS for a long time. For example, if an operator in the DSMS receives as its two inputs (1) a silent relation and (2) a stream, then data from the stream must be kept buffered at the operator, until receipt of the next incremental change from the source of the silent relation before the operator can perform its operation (e.g. a Join or Union). Note that the DSMS has no information on how the time changes in the silent relation's source, relative to a stream's source.

The just described problem may be overcome by requiring the silent relation's source to send a time stamp (with or without data), even when there has not been any change in data, and such a transmission is commonly referred to as a "heartbeat." Receipt of a heartbeat from a source by the DSMS indicates that all data from this source will have a later time stamp than the heartbeat's time stamp. The heartbeat may or may not be periodic, but successive heartbeats must arrive in a monotonically non-decreasing time sequence at the DSMS. The DSMS handles heartbeats in the normal manner of handling any other data, except that there is no data associated with the heartbeat. Specifically, the relation value does not change, its value at the timestamp of the heartbeat is the same as its value on the last timestamp received from the operator (the one before the last heartbeat). However, use of heartbeats requires the source to send time stamps, which is problematic for sources that traditionally do not normally supply time stamps, such as a database.

SUMMARY

A computer is programmed in accordance with the invention to implement a data stream management system (DSMS) that receives data for one or more relations infrequently relative to receipt of streams of data. During execution of any given operator in a global execution plan for processing data (e.g. stock quotes) of an application (such as a financial system) from multiple streams and relations, the DSMS handles receipt of data from any input whose relation is (or has fallen) silent based on a maximum time stamp within the DSMS that has been received from the application. The relation is marked silent by the user during relation creation. When an input from a silent relation is received (which is a rare event), the timestamp is not present in it. Accordingly, DSMS of some embodiments take responsibility to mark the input with a timestamp. In several such embodiments, the DSMS takes the maximum timestamp it has received so far, and marks that as the timestamp from the silent relation. Moreover, the DSMS of some embodiments also processes data from an input ("active input") of an operator (that has two or more inputs), by using a maximum time stamp received at the active input to stamp previously-received data at an empty input if a group of predetermined conditions are met. One predetermined condition is that the empty input's operator has all its own inputs silent. And another predetermined condition is that a maximum time stamp that is currently present among all the inputs of the empty input's operator is equal to a time stamp that was last received from these same inputs (of the empty input's operator). When both conditions are met, then the DSMS continues execution, by using previously received data from the empty input (which as noted above is time stamped with the same time stamp as the most recently received data from the active input).

Hence, some embodiments of a DSMS in accordance with the invention eliminate a prior art requirement on the source of a static relation (also called "silent relation") to transmit heartbeats, which otherwise imposes an undue burden on real world applications. Accordingly, a DSMS of the type described herein may support use of a database as the source of a silent relation, even if the database management system (DBMS) does not supply heartbeats and/or time stamps.

BRIEF DESCRIPTION OF THE DRAWINGS

FIG. 2 illustrates, in an intermediate level diagram, a data stream management system (DSMS) that has been extended in accordance with the invention to support adding new continuous queries during operation on existing continuous queries.

FIG. 3 illustrates, in a flow chart, methods that are executed by the extended DSMS of FIG. 2, in some embodiments of the invention to respond to addition of new continuous queries that use silent relation(s) in accordance with the invention.

FIG. 6 illustrates, in a high level block diagram, hardware included in a computer that may be used to perform the methods of FIGS. 4 and 5 in some embodiments of the invention.

DETAILED DESCRIPTION

Figure 1A:
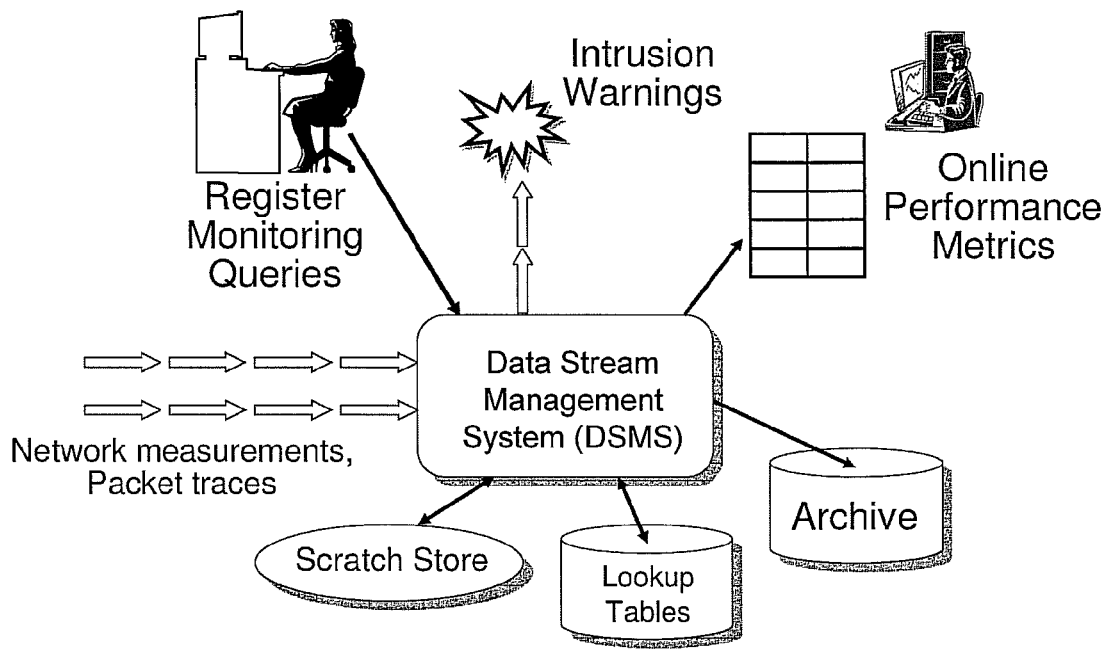
FIGS. 1A and 1B illustrate, in a high level diagram and an intermediate level diagram respectively, a data stream management system of the prior art.
Figure 1B:
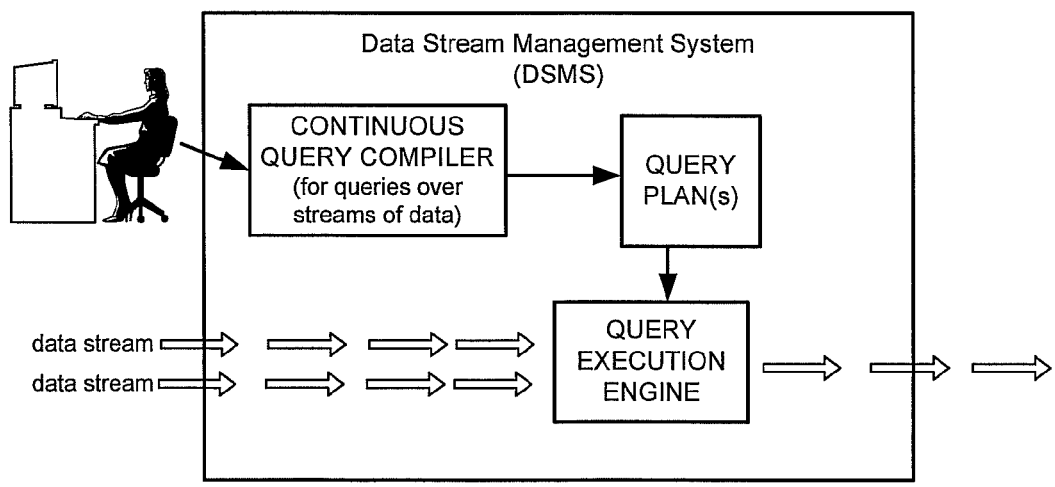
Figures 1C, 1D, 1E:
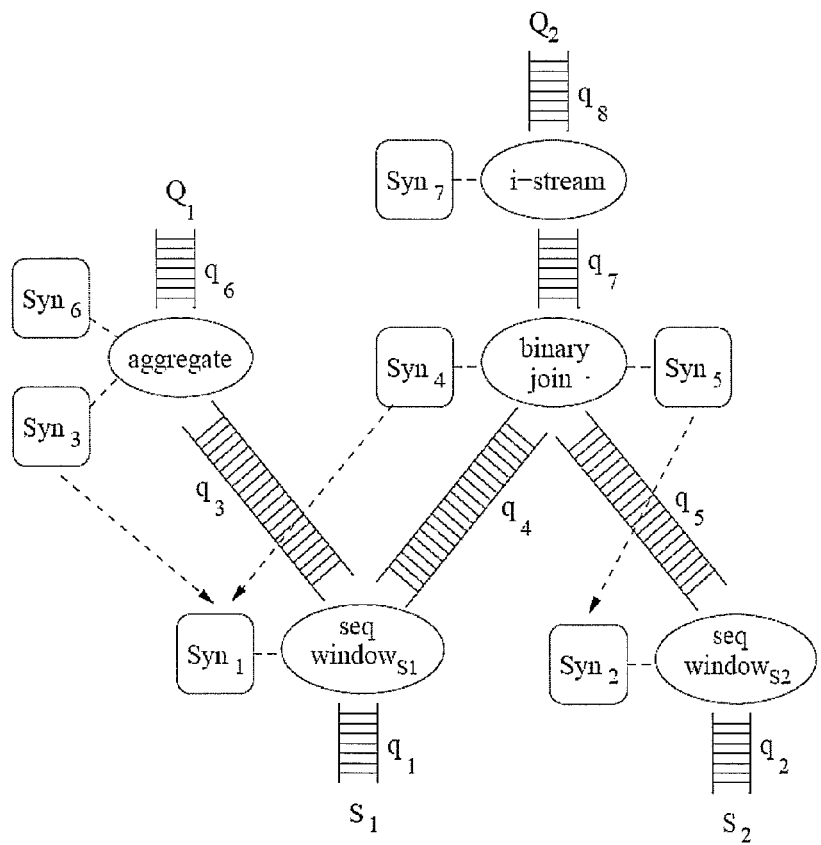
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream.

A DSMS which includes a computer programmed as described in published literature about the Standford Stream Data Management (STREAM) Project is extended by programming it with certain software in several embodiments of the invention called a continuous query compiler, as discussed below. A continuous query compiler is implemented in accordance with the invention to receive and act on a new continuous query q that uses data of silent relations even from sources that do not generate heart beats, such as a database. Accordingly, such a DSMS in accordance with the invention is hereinafter referred to as an extended DSMS.

After receipt, new continuous query q is automatically compiled by continuous query compiler 210 (FIG. 2) performing several acts that are normally performed to implement query compilation, and after compilation the new continuous query q is automatically executed. Query receipt, compilation and execution are performed by some embodiments of extended DSMS 200 (FIG. 2) while processing incoming streams of data 250 by executing thereon one or more continuous queries that were already being executed ("existing queries") prior to receipt of the new continuous query q.

Note, however, that extended DSMS 200 (FIG. 2) may also be used in applications that do not support addition of new queries at run time, after execution of existing queries begins. In the just-described embodiments, all queries are added ahead of time, and if a new query is to be added, processing of stream data by the extended DSMS 200 (FIG. 2) may be halted momentarily to accommodate compilation of a new global execution plant that includes the new query.

Regardless of when and how it is invoked, continuous query compiler 210 parses a new continuous query q to build an abstract syntax tree (AST), followed by building a tree of operators. Such a tree of operators typically includes, one or more operators (also called "source operators") that act as source(s) of tuples based on incoming data stream(s) 250 (FIG. 2), and/or source(s) of a stream of information on a relation received via link 243. In addition to source operators (which are typically but not necessarily located at leaf nodes), the tree of operators includes one or more operators at intermediate nodes (called "query processing operators") that receive data streams from the source operators, and a single root node which includes an output operator to output the results of processing the query.

In some embodiments of the invention, continuous query compiler 210 also generates for each operator a list which identifies those inputs of the operator that are known to be based on silent relations. Depending on the embodiment, the list may be built in a bottom-up manner. Hence, DSMS 200 maintains information on the silent nature (or alternatively active nature) of the various inputs to each operator. The information has to be provided by the user.

In some embodiments, DSMS 200 determines that an operator's output data constitutes a silent relation if all of that operator's inputs are also based on silent relations. Accordingly, the list for each operator may be prepared at the same time the tree is being built, i.e. by continuous query compiler 210. The tree of operators is typically included in a logical plan which does not reference any physical structures. In creating the logical plan, any semantic errors are flagged (e.g. any type mismatches and/or references to non-existent sources of data streams). The nodes of a tree in the logical plan are typically logical operators that are supported by the continuous query language (CQL), such as SELECT, UNION and JOIN.

Several embodiments then create for that same new query q various physical operators and related resources, such as memory for a queue, needed to execute the query. Physical operators accept data of streams and/or relations as input and generate as output data of streams and/or relations. In this process, if the new continuous query q uses an operator already existing in a global plan located in memory 290 that is currently being executed (also called "executing plan") by query execution engine 230 on incoming stream(s) 250, then continuous query compiler 210 does not create a new physical operator. Instead, continuous query compiler 210 just modifies the executing plan in memory 290.

An executing plan which is currently being used by DSMS 200 contains physical resources of all operators for all queries currently being executed. Accordingly, as per act 308 in FIG. 3, to support execution of the new query, continuous query compiler 210 builds an physical tree (based on physical operators described above) for use in a global plan that is currently being executed by DSMS 200. At this stage DSMS 200 also marks relation operator(s) as being silent if all their input operators are marked to be silent. In act 308, DSMS 200 also creates an execution tree, and includes for each marked operator of the execution tree a list of that (marked) operator's inputs which are known to be based on static relations. Note that the term "inputs" is used sometimes herein as an abbreviation for "input operators".

Then, as per act 309, continuous query compiler 210 alters the processing of incoming data streams 250 by query execution engine 230. After being altered, query execution engine 230 continues its processing of incoming data streams 250 by executing thereon not only the existing queries but also the new query. In some embodiments, a scheduler is invoked to allocate time slot(s) for any new operator(s) of the new query that are referenced in the modified plan that results from modification in act 308. Execution of the modified plan eventually results in execution of the new continuous query at an appropriate time (depending on when its operators are scheduled for execution), in addition to execution of existing queries. In case of embodiments that do not support on-the-fly query addition, a modified execution plan is created afresh, by together compiling all previously existing queries with any newly added queries, as will be apparent to the skilled artisan in view of this disclosure.

Act 301 and portions of 308 (e.g. query parsing and logical tree construction) may be performed by continuous query compiler 210 of extended DSMS 200 in a manner similar or identical to a normal DSMS, unless described otherwise herein. Extended DSMS 200 of some embodiments accounts for the fact that a relation may fall silent at any time during operation of extended DSMS 200 (e.g. while processing data from other sources, such as streams or non-silent relations), by each operator ("current operator") checking (e.g. on being awakened) which, if any, of its inputs is empty ("empty input"). Specifically the current operator cycles through all its inputs that are from a relation operator (as per act 312 in FIG. 3) to see if no data is being output to the current operator. If any input is empty, the current operator processes data from one or more other inputs ("active inputs"), as if a message with no data ("null message") but including a timestamp was in fact received at the empty input as per act 313, when a group of predetermined conditions are met.

If the predetermined conditions (described in the next paragraph) are met, the null message's time stamp is assumed to be a predetermined function of the time stamp in the latest message that has been received from a non-empty input of the current operator. In one illustrative example, the predetermined function is an identity function, wherein the null message is assumed to have the same time stamp as the latest message. In another example, the predetermined function changes the latest message's time stamp (e.g. by increasing it or decreasing it by one unit), depending on the embodiment. Accordingly, a time stamp that is assumed in the null message may be same as (or in some manner derived from or based on) a time stamp that is associated with the data from the active input.

Examples of predetermined conditions include (a) empty input's operator is marked (during compilation as per act 308) for having all its inputs silent and (b) the maximum time stamp currently present in all silent inputs of the marked operator is equal to a time stamp that was most recently received from those silent inputs. In some embodiments, both these conditions must be satisfied, and then receipt of a null message is assumed at the conclusion of act 313 (FIG. 3).

Thereafter, as per act 314, the query execution engine processes the data from active input(s) based on the assumed heartbeat at the silent input, to supply the data to the operator's output(s). For example, if the current operator is performing a two-input UNION operation, then the data from the active input is simply supplied as the output of the current operator. As another example, if the current operator is performing a two-input JOIN operation, then the data from the active input is joined with most-recently received data from the empty input, and the result is supplied as the output. Other embodiments of DSMS 200 may implement the propagation of an assumed null message differently, but regardless of how propagated, any data received at the active input of an operator is not buffered (i.e. execution of the operator is not suspended) if the two predetermined conditions are met by the operator. If any of these two conditions is not met, then execution of the operator is suspended, until a message is received at the empty input.

Awakening of operators in an executing plan and propagation of a silent relation's assumed heartbeat (also called "simulated heartbeat") can be performed in any order relative to one another depending on the embodiment. For example, although act 311 is shown as being performed before act 313 in FIG. 3, other embodiments perform act 313 before performing act 311. Operator awakening in some embodiments is performed by a scheduler in query execution engine 230 that is programmed to automatically determine (e.g. in a round robin fashion) an order of execution of each operator relative to other operators. The scheduler's list of operators is updated with any new operators that may be required for new queries during registration. Depending on the embodiment, the scheduler may either preallocate time slots to all operators, or alternatively allocate time slots to each operator individually in a dynamic just-in-time manner.

Accordingly, during registration of each new continuous query, the scheduler allocates a time slice for execution of each new operator therein. In several embodiments, the scheduler operates without interrupting one or more operators that are being executed in a current time slice. Hence, in some embodiments, the processing of existing queries is altered to permit processing of the new query thereby to effect a switchover from a currently executing plan to a modified executing plan. In an illustrative embodiment, altering of normal processing is performed at the end of a current time slice, with no delay (i.e. not noticeable in output stream 231 in FIG. 2) in execution of existing queries.

Accordingly, after registration of a new continuous query as described above, the extended DSMS continues to perform processing of input data streams 250 in the normal manner but now using the new query in addition to existing queries, i.e. based on the modified plan. Hence, output data streams 231 that were being generated by execution of existing queries continue to be generated without interruption, but are supplemented after the altering of processing, by one or more data streams from an output operator of the new continuous query, i.e. by execution of the new continuous query.

Information about the current state of a relation that is supplied by link 244 is typically held in a store 280 in extended DSMS 200. Store 280 is typically multi-ported in order to enable multiple readers to access information stored therein. Store 280 may be used to store a relation R's information such as a current state R(t). In certain embodiments relation R is represented in an incremental manner, by tuples that are time stamped, and represent requests for incremental changes to the relation's initial state R(0). An example of a relation that may be represented in this manner is the number of chairs in a conference room. However, other embodiments do not use tuples, and instead maintain in memory an image of the relation's current state R(t), and this image is changed dynamically as relation R changes over time. An example of a relation that may be represented by an image is a Range Window operator on a stream, e.g. if window depth is 10, then such an image holds just 10 tuples.

In embodiments that use tuples to represent a relation, tuples are typically received in extended DSMS 200 in the form of a data stream, e.g. carried by a communication link 242 from a user as shown in FIG. 2. Depending on the embodiment, the tuples of a relation may represent requests for two types of changes, namely requests to insert information or requests to delete previously inserted information, which may respectively constitute an Istream or Dstream as described in the paper by A. Arasu, S. Babu, and J. Widom entitled "The CQL Continuous Query Language: Semantic Foundation and Query Execution" that has been incorporated by reference above.

The just-described stream representation of a relation in some embodiments, by time stamped tuples, is also referred to herein as an incremental representation. Although the incremental representation of a relation uses streams (i.e. Istream and Dstream), note that the relation's state is relatively static (e.g. relative to data stream 250). Hence, in practice, streams Istream and Dstream for a relation are several orders of magnitude smaller (in the rate of information flowing therein) than streams normally processed by extended DSMS 200. Use of Istream and Dstream to represent such a static relation enables several embodiments to process all information in extended DSMS 200 using a single data type, namely the stream data type. In contrast, as noted above, certain alternative embodiments of the invention store a relation's current state information in a non-incremental representation and hence use both data types.

Furthermore, in these embodiments, store 280 has a mechanism (e.g. a list) that is included for relations (and optionally for streams), which mechanism allows identification in store 280 of any inputs of the current relation that are static relations. Accordingly, execution of a new continuous query in such embodiments uses such a list in act 313, e.g. to check the condition (b) described above directly, without traversal of the operator tree to the next lower level operators. As noted elsewhere, the list is constructed for each operator during compilation of a query. In some embodiments, only bottom-most operators in an execution tree of a query are explicitly identified by a user as a relation that is static. Thereafter, the extended DSMS 200 automatically infers an operator as generating a static relation at its output if all its inputs are themselves static relations.

Note that a new tuple of a relation is propagated (as per act 314), to all outputs of the corresponding operator (i.e. using assumed heartbeats for silent relations, or actual data from active relations). The new tuple of a relation may be generated in any manner, depending on the embodiment. For example, the new tuple may arise from changes to a relation that are identified by a user, via a communication link 242 into store 280 of extended DSMS 200 (FIG. 2). Alternatively, the new tuple may also be generated within the extended DSMS 200 itself, e.g. by a window operator in query execution engine 230 from a stream, which new tuple is stored via line 241 (FIG. 2) in store 280. Note that act 313 (FIG. 3) is not required in case of execution of a stream operator by query execution engine 230, which transfers control directly to act 314. Act 314, as noted above, propagates the new tuple to all outputs of the operator (in this case, the stream operator).

In the rare occasions when data is received from a silent operation's source operator (as per act 391 in FIG. 3), the above-described query execution engine 230 (FIG. 3) performs act 392. In act 392, a maximum time stamp within the DSMS 200 that has been received from any input source is used to stamp the data received in act 391. Note that the data received by the DSMS from a silent relation does not contain any time stamp and hence the DSMS automatically increments the maximum time stamp by 1 and uses the result as a time stamp of the source's data.

Depending on the embodiment, the extended DSMS 200 may perform act 313 at any time before act 314, after execution resumes with the modified executing plan. In some embodiments, act 313 is performed at whatever time the relation operator that is being shared (between one or more existing queries and one or more new continuous queries) is scheduled to be executed next. In several embodiments, extended DSMS 200 schedules operators on a round-robin basis, although other scheduling mechanisms may also be used in accordance with the invention, depending on the embodiment.

In certain alternative embodiments, act 313 (FIG. 3) may be performed even before the scheduled awakening of, and execution of the shared relation operator, depending on the architecture (e.g. if a relation operator is architected to propagate only incremental changes to state and does not contain functionality to propagate the entire state of the relation). As noted elsewhere herein, in some embodiments the relation does not have an incremental representation at all and instead a complete value of the relation is propagated every time, in which case propagation by act 313 is not performed.

Note that although a procedure for propagating previously-received information to an operator's newly added outputs has been described above in the context of sourcing tuples of a relation, the same procedure may also be used in some embodiments by an operator that sources tuples of a view relation operator (i.e. an operator that sources the information to implement a view on top of a relation). In this context, a view of extended DSMS 200 has the same semantics as a view in a prior art database management system (DMS).

Figure 4:
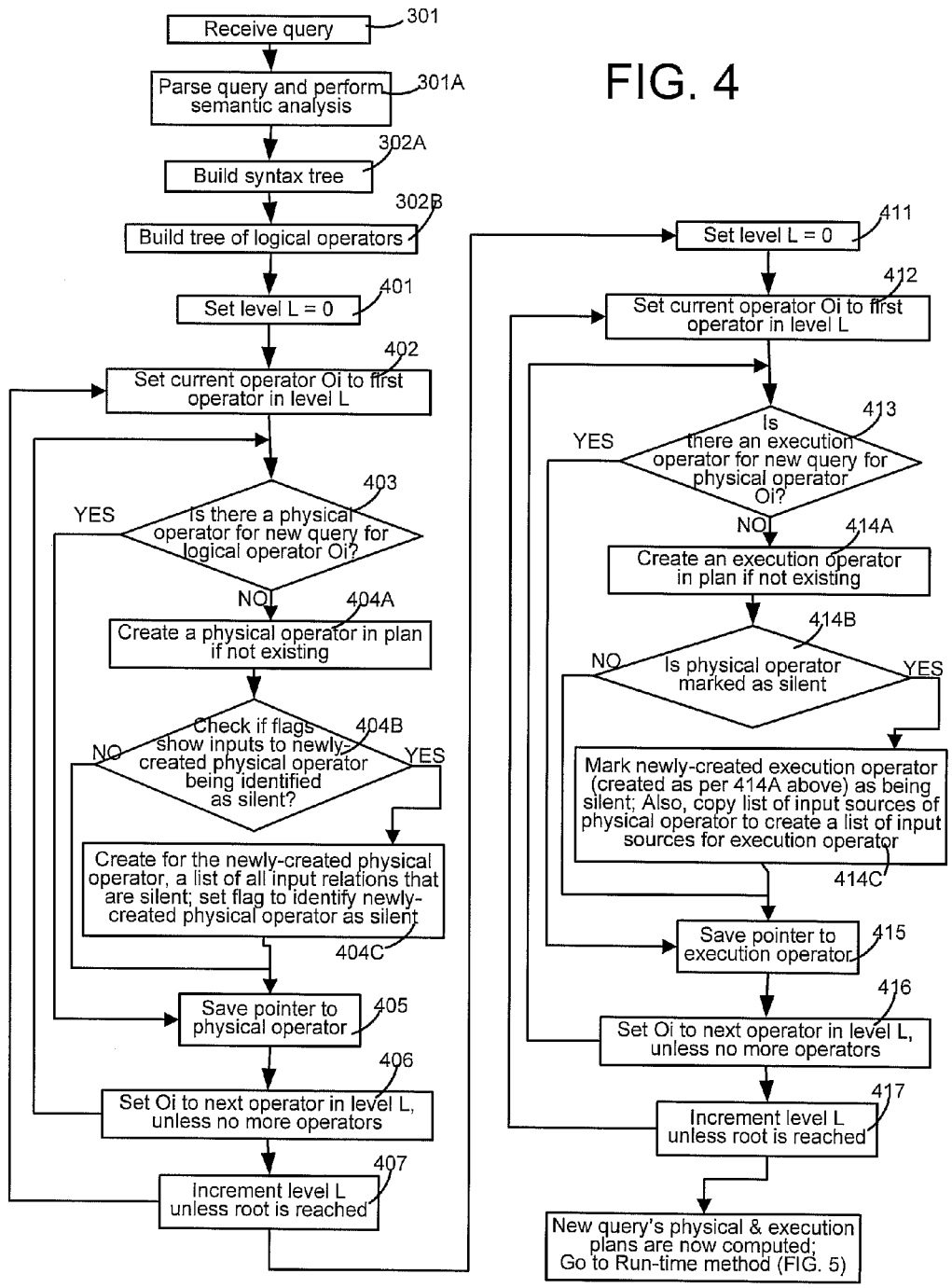
FIGS. 4 and 5 together illustrate, in a flow chart, acts of a method that is performed in some embodiments of the invention, to compile and execute a continuous query that uses a silent relation in accordance with the invention.
Figure 5:
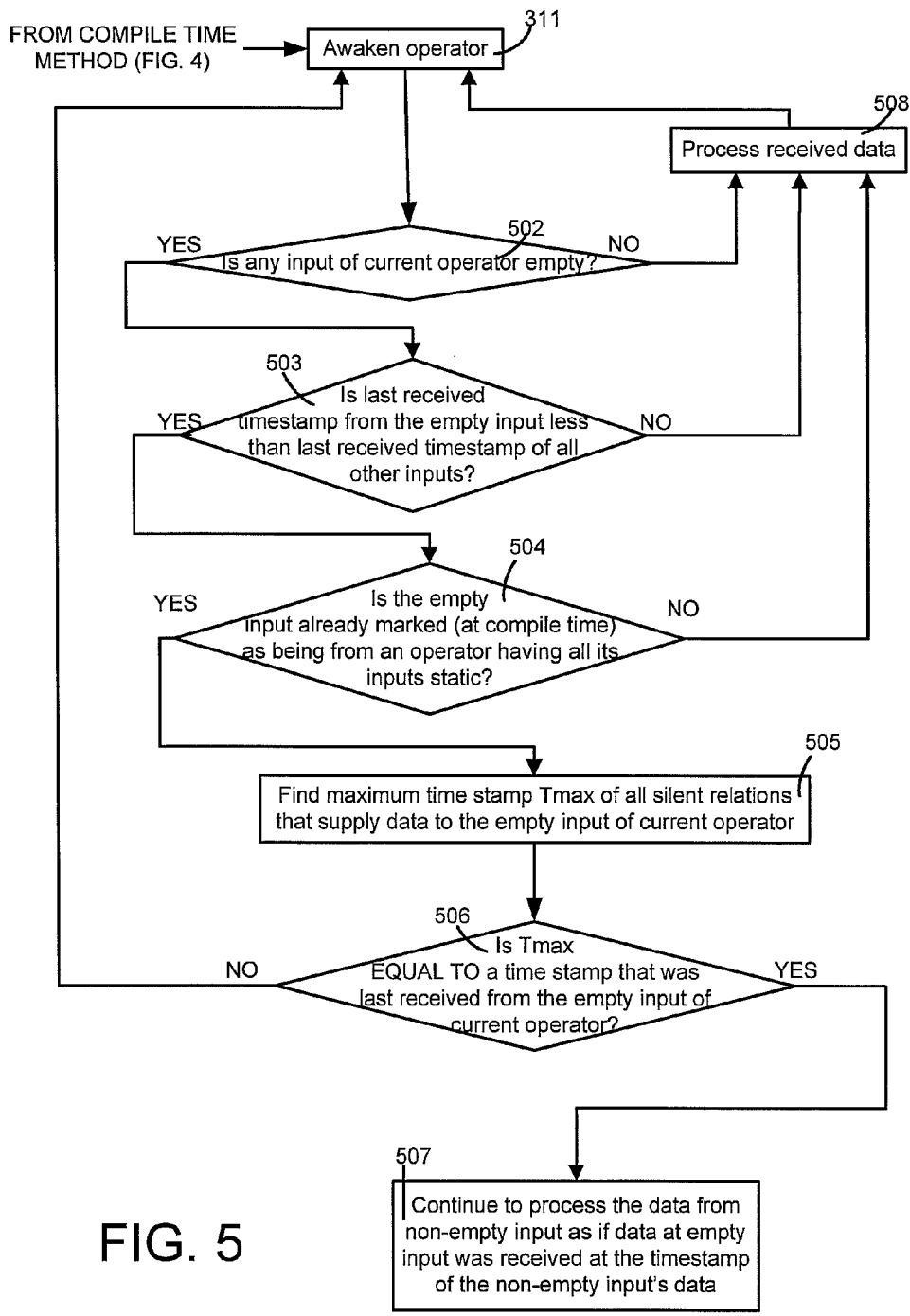

In some embodiments, a computer of extended DSMS 200 is programmed to perform the two methods illustrated in FIGS. 4 and 5 respectively at compile time (when a query is received) and at run time (when the query is executed). Specifically, a query is received in act 301 (FIG. 4), followed by parsing of the query and performance of semantic analysis in act 301A, followed by building of a syntax tree in act 302A, followed by building of a tree of logical operators in act 302B. Note that the just-described acts can be performed in any manner known in the prior art, e.g. as in any prior art DSMS.

In act 401, the level L is set to zero, after which time the computer enters a loop between act 402 (which initializes a current operator Oi to a source operator at level L) and act 407 (which increments the level unless root is reached in which case control transfers to act 408, indicative that query compilation has been completed). In the just-described loop of FIG. 4, extended DSMS 200 is programmed in several embodiments to traverse the tree of logical operators (built in act 302B), in a bottom-up manner as discussed next although other embodiments of the invention may traverse such a tree in a different order.

After act 402 (FIG. 4), the computer checks (in act 403) if there exists a source operator in a global plan that is currently being executed, for the source operator Oi selected in act 402. Note that in this act 403, the illustrative embodiment checks only on source operators, such as a source of a relation or a source of a stream. If the answer is no, then as per act 404A, the computer creates a new physical operator in a global plan (which is global across multiple queries), and thereafter proceeds to act 404B. In the illustrative embodiment, if the operator is not a source operator, then also act 404A is performed, i.e. a new physical operator is created if the corresponding logical operator (such as a filter) is not a source (of a stream or relation).

In act 404B, the computer checks if inputs to the new physical operator are identified as being static (or silent) e.g. by flags in store 280. If the answer is no, then the computer goes to act 405 (described below). If the answer is yes, the computer goes to act 404C to create for the new physical operator a list that identifies all its inputs that are based on silent relations. In act 404C, the computer sets a flag to mark newly-created physical operators as being identified to be silent. Then the computer goes to act 405.

In act 405, the computer saves a pointer to the physical operator that was created in act 404A or alternatively found to exist in act 403. After saving the pointer, the computer goes to act 406 to increment operator Oi to the next operator in current level L and transfer control to act 403, unless there are no more unvisited operators in level L in which case the computer increments the level L in act 407 and returns to act 402 unless root is reached in which case control transfers to act 411 wherein the level L is reset to 0. At this stage, creation of the physical plan has been completed, and creation of the execution plan is started. Next, acts 412-417 are performed to prepare the execution plan based on the physical plan, in a manner similar to that described above for acts 402-407 which prepare a physical plan based on a logical plan (which contains the tree of logical operators). Note that act 414C differs from act 404C, specifically by simply marking the newly-created execution operator as being silent (based on flag(s) set in act 404C). Moreover, in act 414C, the computer simply copies a list of input sources of the physical operator (which list was created in act 404C) to create a list of input sources for the execution operator.

Note that, during creation of the execution plan, actual resources in DSMS 200 are allocated, to hold run-time control information and/or data as may be necessary for processing real time data streams and/or relations. Specifically, in some embodiments, the DSMS uses a logical plan for each query, in addition to a global physical plan and a global execution plan for all the queries registered in the system. In these embodiments, in the global physical plan, the operators are linked with each other directly, whereas in the global execution plan, they are completely independent of each other, and are indirectly linked with each other via queues. Moreover, in several such embodiments, a global physical plan contains physical operators, whereas a global execution plan contains execution operators. The physical operators of certain embodiments are directly linked with each other, whereas the execution operators are not. Physical operators of many embodiments contain the compile-time information, whereas the execution operators contain the run-time information and are scheduled by the scheduler. The compiler of certain embodiments uses a physical plan created by acts 402-407 for optimization (e.g. merging, sharing, the type of store to be used etc.) and then the corresponding execution operators are created in acts 412-417.

During run time, the computer is programmed to perform the method illustrated in FIG. 5 for some embodiments. Specifically, in such embodiments, the computer performs act 311 (FIG. 5) wherein an operator for the new query (called "current operator") is awakened, at an appropriate time as determined by a scheduler. Next, the current operator checks, in act 502, if any of its inputs does not have a message that contains data (i.e. if it is an empty input). If the answer is no, then the current operator proceeds to act 508 to process the data at its inputs in the normal manner. If the answer is yes, then the current operator proceeds to act 503. In act 502 the operator checks if the most-recently received time stamp from its silent input is less than the most-recently received time stamps from all its other inputs (i.e. active inputs, also called non-empty inputs). If the answer is no, then the current operator again proceeds to act 508 to process the data in the normal manner.

In performing act 508 at this stage, as there is an empty input, and any processing that needs data from the empty input is not performed and instead the corresponding data from active inputs of the current operator is buffered for future (i.e. for receipt of actual data or an assumed null message, from the silent input). If the answer is yes in act 503, then the current operator proceeds to act 504. In act 504 the operator checks if all inputs to (i.e. input operators of) the empty input of the current operator are themselves based on static relations. This check is performed in some embodiments by looking up a list that is created (as per acts 404C and 414C described above) for the current operator during query compilation. If the answer is no in act 504, then the current operator again proceeds to act 508 to process the data in the normal manner. At this stage as well, data supplied by active inputs may remain unprocessed and buffered, as described in the first sentence of this paragraph, due to the current operator having empty input(s).

If the answer is yes in act 504, then the current operator proceeds to act 505 to find the maximum time stamp Tmax, from among all static relations on which is based the empty input of the current operator (i.e. every operator within a subtree below the empty input of the current operator). Next, the current operator goes to act 506 to check if the maximum time stamp Tmax is equal to a time stamp that was most-recently received from the empty input of the current operator. If the answer is no, then the operator goes to sleep without any further processing, by returning to act 311 and awaiting awakening at the next scheduled time. If the answer is yes, then the operator goes to act 507 to process the data from the active input(s) of the current operator as if data has been received from its empty input (i.e. assumes a time stamp that is derived from the active input's time stamp). After processing the data using the assumed time stamp, the operator returns to act 311 to await awakening at the next scheduled time.

In some embodiments, the assumed time stamp is identical to the time stamp received from an active input, in case of a two-input operator. In case an operator has a third input, and only one of the inputs is empty, the execution works similar to the scenario with 2 inputs. If the conditions (same for 2 inputs are met), a null message is assumed from the empty input with a timestamp equal to the maximum timestamp of the 2 active inputs.

Note that although in some embodiments a time stamp for the empty input has been described as being automatically generated based on the time stamp of data from the active input, alternative embodiments assign a time stamp to the empty input independent of the time stamp from the active input. For example some alternative embodiments simply use the current wall clock time in the extended DSMS 200 for use with data in the empty input (if all active inputs are also using the wall clock time).

Note that the extended data stream management system 200 may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another computer-readable medium, such as storage device 610. Execution of instructions contained in main memory 606 causes processor 604 to perform the process steps described herein. In alternative embodiments, hard-wired circuitry may be used in place of or in combination with software instructions to implement an embodiment of the type illustrated in FIGS. 5A-5C. Thus, embodiments of the invention are not limited to any specific combination of hardware circuitry and software.

The term "computer-readable storage medium" as used herein refers to any storage medium that participates in providing instructions to processor 604 for execution. Such a storage medium may take many forms, including but not limited to, non-volatile media, volatile media, and transmission media. Non-volatile media includes, for example, optical or magnetic disks, such as storage device 610. Volatile media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter, or any other storage medium from which a computer can read.

Various forms of computer readable storage media may be involved in carrying the above-described instructions to processor 604 to implement an embodiment of the type illustrated in FIGS. 5A-5C. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a code bundle through Internet 628, ISP 626, local network 622 and communication interface 618. In accordance with the invention, one such downloaded set of instructions implements an embodiment of the type illustrated in FIGS. 4 and 5. The received set of instructions may be executed by processor 604 as received, and/or stored in storage device 610, or other non-volatile storage for later execution. In this manner, computer system 600 may obtain the instructions in the form of a carrier wave.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

As noted above, a null message with a time stamp which is identical to a time stamp of a latest message at an active input of an operator is assumed or is internally generated within a DSMS of some embodiments. However, in certain alternative embodiments of DSMS are designed to process and use heartbeats that are externally generated, for example by a client computer that supplies data to the DSMS. Accordingly, in the alternative embodiments, even if a heartbeat is not received at an empty input, the DSMS assumes the heart beat as being received when certain predetermined conditions are met as described above for a null message.

Numerous modifications and adaptations of the embodiments described herein will be apparent to the skilled artisan in view of this current disclosure. Accordingly numerous such modifications and adaptations are encompassed by the attached claims.

Following Subsection A of the detailed description is an integral portion of the current patent application and is incorporated by reference herein in its entirety. Subsection A describes one illustrative embodiment in accordance with the invention.

Subsection A (of Detailed Description)

A method performed in some embodiments is described below. In this attachment, lineage of an operator 'A' refers to the set of operators contained in that subtree rooted at 'A'.

1. For each base stream and relation, maintain the maximum timestamp of a tuple received on that stream/ relation. Note that these can be main tained locally by the corresponding source operators and does not require any synchronization. For a stream S (relation R), let this be denoted by MaxTime(S).
2. For each base relation, maintain "tupleNum"—a counter to distinguish between tuples having the same timestamp.
3. When a base relation receives a tuple, the timestamp to be assigned to this is determined as max {MaxTime(T) |T is a base stream or relation}. Determining this will require obtaining a "high level" semaphore, that will prevent execution of any of the source operators (note that other non-source operators can execute concurrently).
4. Note, by the assumption that the relation changes rarely, this is a rare operation.
5. Every operator will propagate their timestamp every time their time stamp changes (Note this can happen through piggybacking or through explicit heartbeats as in the case of a tuple not matching a filter condition) or Every operator will propagate their timestamp when the inputs are empty and when the latest timestamp has not been propagated.
6. While determining the physical plan, each operator will have a flag —onlyBaseRelsInLineage—per input. This will be true if and only if all the base tables in the lineage of the input to the operator are relations (and not streams). It is easy to determine this flag while preparing the physical plan.
7. For operators with exactly one input—nothing more to do (other than the heartbeat step)
8. For operators with more than one input (example JOIN, UNION, EXCEPT). We consider only binary operators but the logic can be easily extended to operators with more than two inputs.
    1. For each input, maintain set of base relations in the lineage. For each such relation, maintain last tupleNum seen.
    2. For each input, maintain the last timestamp received from its input
    3. Consider the situation when such an operator blocks on input I1 (since it receives an input on the other input I2).
        1. Let current timestamp on I1 be t1. Let the input on I2 be t2>t1
        2. If onlyBaseRelsnInLineage(I1) is not true, then do nothing else
        3. Determine if there is at least one base relation in lineage of I1 that has progressed (compare [t1, tupleNum] with [MaxtTime(R), tupleNum] for each base relation R in lineage of I1). This will involve taking locks on the source relation operators stalling their execution.
        4. If so, then do nothing else. Due to heartbeat step, a heartbeat corresponding to this progress should eventually reach this operator.
        5. If none of the base relations have progressed, set t1 to t2 and tupleNum to 0. Now, at this point the processing for this operator can proceed. (This step could be operator dependent). Essentially the idea here is that we have deduced that there has been no further input in the base relations in the lineage of I1 and any further input will be timestamped>t2.

Analysis

The above protocol is efficient since it is by and large "localised" and does not hamper concurrency. The only instances when concurrency is impacted is when a base relation is refreshed and when an operator is blocked, further this only blocks other base relations. Since updates to base relations are rare, this protocol does not impact concurrency too much.

To reduce operator blocking, when the operator peeks into the other input, it could get the maximum timestamp of a tuple in the queue at that point. In this case, the timestamp modification step can be modified to set t1 to this max timestamp. This way for all immediate input to be processeed, the blocking removal operation is performed only once.

What is claimed is:

1. A method, implemented in a computer, to manage a plurality of streams of data, and a plurality of relations that supply data infrequently relative to said plurality of streams, the method comprising:

awakening an operator to process said data, said operator comprising a plurality of inputs;

checking if any input in said plurality of inputs of said operator has no data;

based on an outcome of said checking finding no data at said any input, said operator processing by assuming receipt from said any input, a null message with a first time stamp, said first time stamp being derived by said computer from a second time stamp of a latest message comprising at least a portion of said data received from another input in said plurality of inputs if at least one predetermined condition is met; and outputting a stream from said computer, a message in said stream being generated in response to a continuous query based at least partially on said operator processing said data using said null message, and multiple messages including said latest message received on multiple inputs other than said any input;

wherein said at least one predetermined condition comprises checking whether all inputs, of another operator at said any input, have no data.

2. The method of claim 1 wherein:
the first time stamp is same as the second time stamp.

3. The method of claim 1 wherein:
the relation is represented incrementally in the global plan, as a plurality of tuples with each tuple being time stamped; and
all tuples of the relation have a time stamp older than a current time in said computer.

4. A method, implemented in a computer, to manage a plurality of streams of data, and a plurality of relations that supply data infrequently relative to said plurality of streams, the method comprising:

awakening an operator to process said data, said operator comprising a plurality of inputs;

checking if any input in said plurality of inputs of said operator has no data;

based on an outcome of said checking finding no data at said any input, said operator processing by assuming receipt from said any input, a null message with a first time stamp, said first time stamp being derived by said computer from a second time stamp of a latest message comprising at least a portion of said data received from another input in said plurality of inputs if at least one predetermined condition is met; and outputting a stream from said computer, a message in said stream being generated in response to a continuous query based at least partially on said operator processing said data using said null message, and multiple messages including said latest message received on multiple inputs other than said any input;

wherein said at least one predetermined condition comprises checking whether a maximum time stamp among all inputs, of another operator at said any input, is equal to a time stamp that was last received from said all inputs.

5. The method of claim 4 wherein:
the first time stamp is same as the second time stamp.

6. The method of claim 4 wherein:
the relation is represented incrementally in the global plan, as a plurality of tuples with each tuple being time stamped; and
all tuples of the relation have a time stamp older than a current time in said computer.

7. A method, implemented in a computer, to manage a plurality of streams of data, the method comprising:

receiving a new continuous query to be executed on at least a relation in a global plan to execute a plurality of queries on at least said plurality of streams;

creating for at least a first operator in the new continuous query, a list of operators in said global plan, wherein said operators supply data on the relation, and said data is supplied infrequently relative to said plurality of streams;

said computer altering said global plan to include the new continuous query in addition to said plurality of continuous queries, thereby to result in an altered global plan;

wherein the altered global plan treats data received by a third operator at a first input not on said list as if a first time stamp is received at a second input of said third operator from a second operator on said list, said first time stamp being associated with the data from the first operator if a group of predetermined conditions are met;

wherein at least one predetermined condition in said group is if the second operator has no data to supply; and storing the altered global plan in a memory of said computer.

8. The method of claim 7 wherein:
still another predetermined condition in said group comprises checking if a most-recently received time stamp of the second operator is equal to time stamps of all other inputs of the third operator.

9. The method of claim 7 wherein:
the relation is represented incrementally in the global plan, as a plurality of tuples with each tuple being time stamped; and
all tuples of the relation having a time stamp older than a current time in said computer.

10. A non-transitory computer-readable storage medium comprising instructions, said instructions comprising:

instructions to receive a new continuous query to be executed on at least a relation in a global plan to execute a plurality of queries on at least said plurality of streams;

instructions to create for at least a first operator in the new continuous query, a list of operators in said global plan, wherein said operators supply data on the relation, and said data is supplied infrequently relative to said plurality of streams; and instructions to at least one computer to alter said global plan to include the new continuous query in addition to said plurality of continuous queries, thereby to result in an altered global plan;

wherein the altered global plan treats data received by a third operator at a first input not on said list as if a first time stamp is received at a second input of said third operator from a second operator on said list, said first time stamp being associated with the data from the first operator if a group of predetermined conditions are met;

wherein at least one predetermined condition in said group is if the second operator has no data to supply.

11. The non-transitory computer-readable storage medium of claim 10 wherein:

still another predetermined condition in said group comprises checking if a most- recently received time stamp of the second operator is equal to time stamps of all other inputs of the third operator.

12. The non-transitory computer-readable storage medium of claim 10 wherein:

the relation is represented incrementally in the global plan, as a plurality of tuples with each tuple being time stamped; and all tuples of the relation having a time stamp older than a current time in said computer.

13. A non-transitory computer-readable storage medium comprising computer instructions, said computer instructions comprising:

instructions to awaken an operator to process data received from a plurality of streams, said operator comprising a plurality of inputs;

instructions to check if any input in said plurality of inputs of said operator has no data:

instructions, responsive to an outcome of execution of said instructions to check finding no data at said any input, to process by assuming receipt from said any input, of a null message with a first time stamp, said first time stamp being derived by a computer from a second time stamp of a latest message comprising at least a portion of said data received from another input in said plurality of inputs if at least one predetermined condition is met; and instructions to output a stream comprising a message generated in response to a continuous query based at least partially on execution of said operator to process said data using said null message, and multiple messages including said latest message received on multiple inputs other than said any input;

wherein said at least one predetermined condition comprises instructions to check whether all inputs, of another operator at said any input, have no data.

14. The non-transitory computer-readable storage medium of claim 13 wherein:

the first time stamp is same as the second time stamp.

15. A non-transitory computer-readable storage medium comprising computer instructions, said computer instructions comprising:

instructions to awaken an operator in at least one computer to process data received from a plurality of streams, said operator comprising a plurality of inputs;

instructions to check if any input in said plurality of inputs of said operator has no data:

instructions, responsive to an outcome of execution of said instructions to check finding no data at said any input, to process by assuming receipt from said any input, of a null message with a first time stamp, said first time stamp being derived by a computer from a second time stamp of a latest message comprising at least a portion of said data received from another input in said plurality of inputs if at least one predetermined condition is met; and instructions to output a stream comprising a message generated in response to a continuous query based at least partially on execution of said operator to process said data using said null message, and multiple messages including said latest message received on multiple inputs other than said any input;

wherein said at least one predetermined condition comprises instructions to check whether a maximum time stamp among all inputs, of another operator at said any input, is equal to a time stamp that was last received from said all inputs.

16. The non-transitory computer-readable storage medium of claim 15 wherein:

the first time stamp is same as the second time stamp.

17. A method, implemented in a computer, to manage a plurality of streams of data, the method comprising:

receiving a new continuous query to be executed on at least a relation in a global plan to execute a plurality of queries on at least said plurality of streams;

creating for at least a first operator in the new continuous query, a list of operators in said global plan, wherein said operators supply data on the relation, and said data is supplied infrequently relative to said plurality of streams;

said computer altering said global plan to include the new continuous query in addition to said plurality of continuous queries, thereby to result in an altered global plan;

wherein the altered global plan treats data received by a third operator at a first input not on said list as if a first time stamp is received at a second input of said third operator from a second operator on said list, said first time stamp being associated with the data from the first operator if a group of predetermined conditions are met;

wherein at least one predetermined condition in said group is if a most-recently received time stamp of the second operator is equal to a time stamp that was last received from all other inputs of said third operator; and storing the altered global plan in a memory of said computer.

18. The method of claim 17 wherein:

the relation is represented incrementally in the global plan, as a plurality of tuples with each tuple being time stamped; and all tuples of the relation have a time stamp older than a current time in said computer.

19. A non-transitory computer-readable storage medium comprising computer instructions, said computer instructions comprising:

instructions to receive a new continuous query to be executed on at least a relation in a global plan to execute a plurality of queries on at least said plurality of streams;

instructions to create for at least a first operator in the new continuous query, a list of operators in said global plan, wherein said operators supply data on the relation, and said data is supplied infrequently relative to said plurality of streams;

instructions to alter said global plan to include the new continuous query in addition to said plurality of continuous queries, thereby to result in an altered global plan;

wherein the altered global plan treats data received by a third operator at a first input not on said list as if a first time stamp is received at a second input of said third operator from a second operator on said list, said first time stamp being associated with the data from the first operator if a group of predetermined conditions are met;

wherein at least one predetermined condition in said group is if a most recently received time stamp of the second operator is equal to a time stamp that was last received from all other inputs of said third operator; and instructions to store the altered global plan in a memory of a computer.

20. The non-transitory computer-readable storage medium of claim 19 wherein:

the relation is represented incrementally in the global plan, as a plurality of tuples with each tuple being time stamped; and all tuples of the relation have a time stamp older than a current time in said computer.

* * * * *

UNITED STATES PATENT AND TRADEMARK OFFICE
CERTIFICATE OF CORRECTION

PATENT NO. : 7,979,420 B2
APPLICATION NO. : 11/873407
DATED : July 12, 2011
INVENTOR(S) : Jain et al.

Page 1 of 1

It is certified that error appears in the above-identified patent and that said Letters Patent is hereby corrected as shown below:

Title page, in column 1, under "Inventors", line 2, delete "Kamataka" and insert -- Karnataka --, therefor.

On page 2, in column 2, under "Other Publications", line 53, delete "Continuos" and insert -- Continuous --, therefor.

On page 3, in column 1, under "Other Publications", line 31, delete "Postdam" and insert -- Potsdam --, therefor.

In column 1, line 42, delete "Standford" and insert -- Stanford --, therefor.

In column 4, line 34, delete "Standford" and insert -- Stanford --, therefor.

In column 14, line 8, delete "main tained" and insert -- maintained --, therefor.

In column 14, line 38, delete "step)" and insert -- step). --, therefor.

In column 14, line 47, delete "input" and insert -- input. --, therefor.

In column 14, line 52, delete "t1" and insert -- Lt. --, therefor.

In column 14, line 54, delete "else" and insert -- else. --, therefor.

In column 15, line 16, delete "processeed" and insert -- processed --, therefor.

In column 17, line 32, in Claim 13, delete "data:" and insert -- data; --, therefor.

In column 17, line 62, in Claim 15, delete "data:" and insert -- data; --, therefor.

Signed and Sealed this
Fifteenth Day of November, 2011

David J. Kappos
*Director of the United States Patent and Trademark Office*